US006907434B2

(12) United States Patent
Maleport et al.

(10) Patent No.: US 6,907,434 B2
(45) Date of Patent: Jun. 14, 2005

(54) MESSAGE ANALYSIS TOOL

(75) Inventors: Joel J. Maleport, Rose Hill, KS (US); Donald B. Farr, O'Fallon, MO (US); Raymond W. Bosenbecker, Chesterfield, MO (US)

(73) Assignee: The Boeing Company, Chicago, IL (US)

(*) Notice: Subject to any disclaimer, the term of this patent is extended or adjusted under 35 U.S.C. 154(b) by 480 days.

(21) Appl. No.: 10/226,534

(22) Filed: Aug. 23, 2002

(65) Prior Publication Data

US 2004/0039743 A1 Feb. 26, 2004

(51) Int. Cl.[7] .............................................. G06F 17/30
(52) U.S. Cl. ...................... 707/104.1; 707/10; 709/204; 709/206
(58) Field of Search .............................. 707/104.1, 10; 709/204, 206

(56) References Cited

U.S. PATENT DOCUMENTS

| | | | | |
|---|---|---|---|---|
| 6,778,651 | B1 | * | 8/2004 | Jost et al. .............. 379/201.01 |
| 2002/0035608 | A1 | * | 3/2002 | Milovanovic .............. 709/206 |
| 2002/0097268 | A1 | * | 7/2002 | Dunn et al. ............... 345/760 |
| 2003/0193960 | A1 | * | 10/2003 | Land ........................ 370/401 |

* cited by examiner

Primary Examiner—Charles Rones

(57) ABSTRACT

A digital message analysis tool for incorporating a digital message standard into a relational database. The tool includes a message standard automation module (MSAM), a message implementation module (MIM) in communication with the MSAM, and, a platform interoperability module (PIM), in communication with the MSAM. The MSAM includes a digital message standard. The MSAM automates the digital message standard into a relational database and provides a first graphic user interface (GUI) that allows a user to view the desired contents of the digital message standard and requirement interdependencies associated within the digital message standard. The MIM includes a second GUI. The MIM develops and provides a message implementation in accordance with the digital message standard. It utilizes the message implementation for providing a message implementation report. The PIM includes a third GUI. The PIM enters a platform digital message implementation for the digital message standard and conducts an interoperability analysis between multiple platform digital message implementations using the third GUI. The PIM also provides a digital message interoperability evaluation report of the evaluation. The MSAM, the MIM, and the PIM cooperate to provide an efficient access to the digital message standard, efficient development of a platform message implementation, and efficient evaluation of interoperability between multiple platforms/programs.

14 Claims, 4 Drawing Sheets

MESSAGE ANALYSIS TOOL

BACKGROUND OF THE INVENTION

1. Field of the Invention

The present invention relates to message analysis tools and more particularly to a digital message analysis tool for evaluating digital message implementations on multiple platforms and their interoperability between platforms.

2. Description of the Related Art

There are complicated issues associated with implementing digital communication using a specific digital message standard on platforms, such as military aircraft, computer systems, and commercial aircrafts/systems.

A first issue is the correct interpretation and understanding of the requirements contained within the digital message standard and the interdependencies of these requirements. There are many requirements associated with each digital message (e.g. transmit and receive requirements) contained within a digital message standard that are required to be implemented if the system is to operate correctly within the digital communication net. Until now, these requirements have been manually associated for each message. This effort takes hours, if not days, to determine all the interdependencies. Many of the digital message standards are provided in a word processor format. This requires the user to manually search for the associated requirements. A solution of providing an automated tool to identify all the inter-relationships has heretofore not been fully implemented.

A second issue is the identification of disconnects between digital message designs for platforms that have already implemented the digital message standard. Finding disconnects between digital message implementations requires the message comparison at the element level on an operational function basis. Each digital message contains many elements that are both required and optional depending on the operational function being performed by the platform. Each operational function performed by a platform requires a specific set of messages and elements be implemented. Until now, for the most part, this comparison has been accomplished manually. This is a very time-consuming effort that is required to be done on each platform being evaluated. A complete automated solution for this comparison has not been developed to date.

A third issue is developing a message implementation that will be interoperable in accordance with the digital message standard. As mentioned above, each operational function has a set of requirements, messages, and message elements that are required to achieve interoperability with other platforms supporting those operational functions. Until now, each platform would have to develop a digital message implementation manually in accordance with the requirements contained in the digital message standard. This is a very time consuming effort. A fully automated solution to the development of a message implementation that is interoperable by operational function has not been developed.

SUMMARY

The present invention is a digital message analysis tool for incorporating a digital message standard into a relational database. In a broad aspect it includes a message standard automation module (MSAM), a message implementation module (MIM) in communication with the MSAM, and, a platform interoperability module (PIM), in communication with the MSAM. The MSAM includes a digital message standard. The MSAM automates the digital message standard into a relational database and provides a first graphic user interface (GUI) that allows a user to view the desired contents of the digital message standard and requirement interdependencies associated within the digital message standard. The MIM includes a second GUI. The MIM develops and provides a message implementation in accordance with the digital message standard. It utilizes the message implementation for providing a message implementation report. The PIM includes a third GUI. The PIM enters a platform digital message implementation for the digital message standard and conducts an interoperability analysis between multiple platform digital message implementations using the third GUI. The PIM also provides a digital message interoperability evaluation report of the evaluation. The MSAM, the MIM, and the PIM cooperate to provide an efficient access to the digital message standard, efficient development of a platform message implementation, and efficient evaluation of interoperability between multiple platforms/programs.

Other objects, advantages, and novel features will become apparent from the following detailed description of the invention when considered in conjunction with the accompanying drawings.

BRIEF DESCRIPTION OF THE DRAWINGS

The same parts or elements throughout the drawings are designated by the same reference characters.

DETAILED DESCRIPTION OF THE INVENTION

Figure 1:
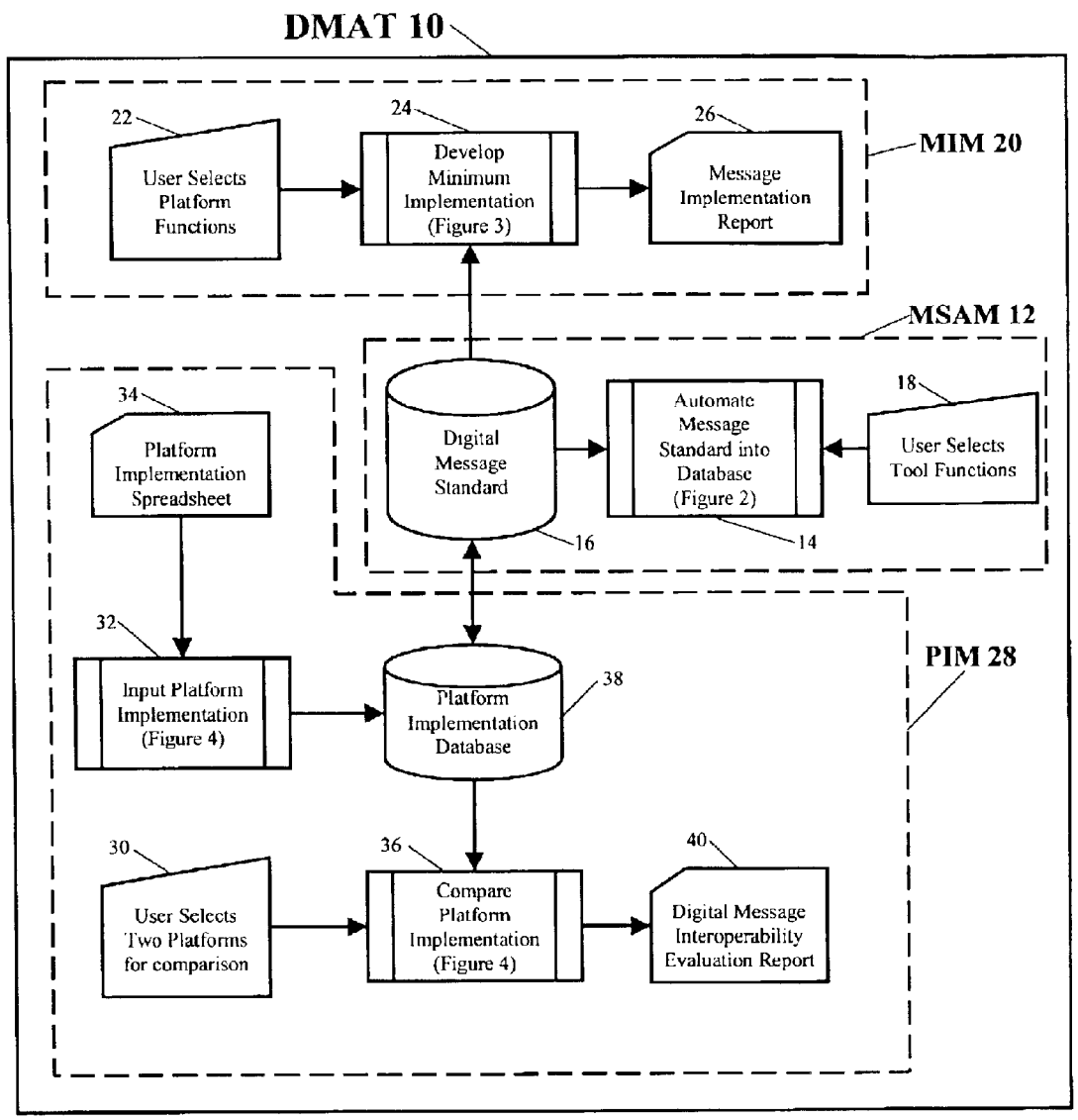
FIG. 1 is a schematic illustration of the top level structure of the Digital Message Analysis Tool (DMAT) of the present invention.

Referring now to the drawings and the characters of reference marked thereon, FIG. 1 illustrates a preferred embodiment of the Digital Message Analysis Tool (DMAT) of the present invention, designated generally as 10. The digital message analysis tool 10 includes a message standard automation module (MSAM) 12. The MSAM 12 automates (see block 14) a digital message standard 16 into a relational database and provides a first graphic user interface (GUI) 18 that allows a user to view the desired contents of the digital message standard 16 and requirement interdependencies associated within the digital message standard 16. The digital message standard may comprise, for example, a plurality of parsed sections that cross-reference the relational database.

A message implementation module (MIM) 20 is in communication with the MSAM 12. The MIM 16 includes a second GUI 22. The MIM 16 develops and provides (see block 24) a message implementation in accordance with the digital message standard, the MIM utilizing the message implementation for providing a message implementation report 26.

A platform interoperability module (PIM) 28 is in communication with the MSAM 12. The PIM 28 includes a third GUI 30. The PIM 28 enters 32 a platform digital message implementation 34 for the digital message standard 16 and conducts an interoperability analysis 36 between multiple platform digital message implementations 38 using the third GUI 34. The PIM 28 also provides a digital message interoperability evaluation report 40 of the evaluation.

Figure 2:
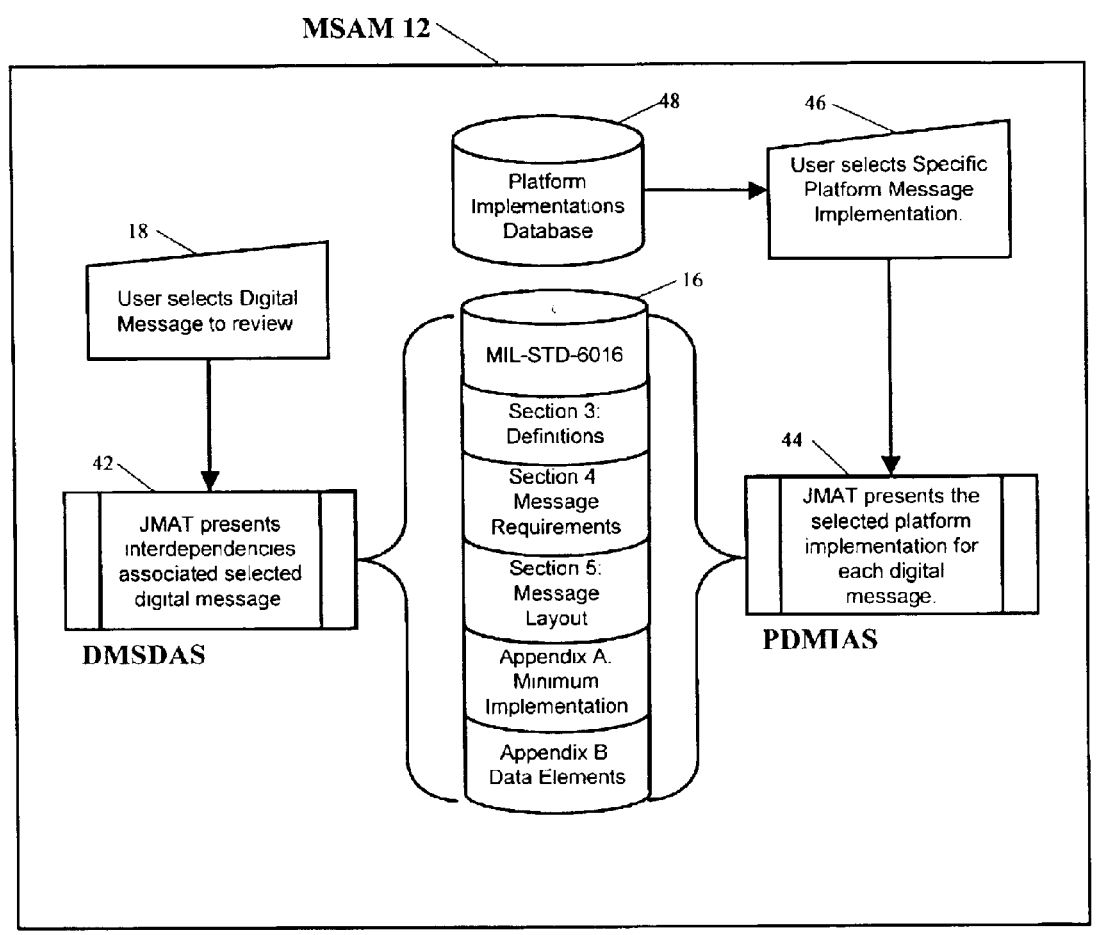
FIG. 2 is a schematic illustration of the digital message standard automation module (MSAM) of the present invention.

Referring now to FIG. 2, a more detailed diagram of the MSAM 12 is illustrated. The MSAM 12 includes a digital message standard database access sub-module (DMSDAS) 42 for allowing a user to view the desired contents of the digital message standard 16 and requirement interdependencies associated within the digital message standard 16. Since the digital message standard 16 is subject to change, the DMSDAS 42 allows the user to select the digital message standard 16 of interest prior to viewing the information contained therein. The DMSDAS 42 allows message, word, and field filtering for items that are not of interest by filtering out items based on the user's selection of function, platform, and implementation specification. Based on the user's message, word, or field selection, the DMSDAS 42 will retrieve how to use the message from the digital message standard 16 thus providing the purpose of the message, the transmit and receive rules, links to requirement interdependencies, the list of words assigned to the message, the list fields assigned to each word, and the allowable field values. Depending on the selected platform or function, the DMSDAS 42 will retrieve implementation specification either from the digital message standard 16 or one of the platform implementation databases 48.

A platform database message implementation access sub-module (PDMIAS) 44 accesses (see block 46) a specific platform digital message implementation 48 of the digital message standard 16 on a message by message basis. Each platform is assigned a unique ID and an independent platform implementation database 48 whereby the respective platform's implementation information is kept separate from all other platforms. The only platform specific information maintained in the digital message standard 16 database is the definition of each platform, the platform unique ID, and the respective platform implementation database 48 filename/location. Each platform implementation database 48 is tied back to the digital message standard 16 by utilizing relational database techniques. The relational database techniques allow each set of messages, words, and fields to be maintained in separate tables. Within each table each message, word, and field is assigned a unique ID whereby fields can define which word they are assigned to and words can define which message they are assigned to. Further, platform implementation databases 48 can refer to these same unique IDs (from the digital message standard 16) when referencing messages, words, and fields as opposed to copying the entire message definition into the platform implementation database file. Within the platform implementation database 48 platform specific implementations for messages, words, and fields are also kept in separate tables. Records in each of the platform specific tables contain the platform's implementation requirements along with the unique message, word, or field ID and the platform ID retrieved from the digital message standard 16 database. When a message is displayed via the DMSDAS 42, the selected platform ID and the chosen message, word, and/or field ID are used to retrieve the platform implementation specification from the platform implementation database 48. Any information that is common to all platforms, such as message definitions, is retrieved from the digital message standard 16 database.

As shown in FIG. 2, in the particular embodiment illustrated, the digital message standard is comprised of the MIL-STD-6016, and there are the following sections, i.e. Section 3: Definitions, Section 4: Message Requirements, Section 5: Message Layout, Appendix A. Minimum Implementation, and Appendix B: Data Elements.

Figure 3:
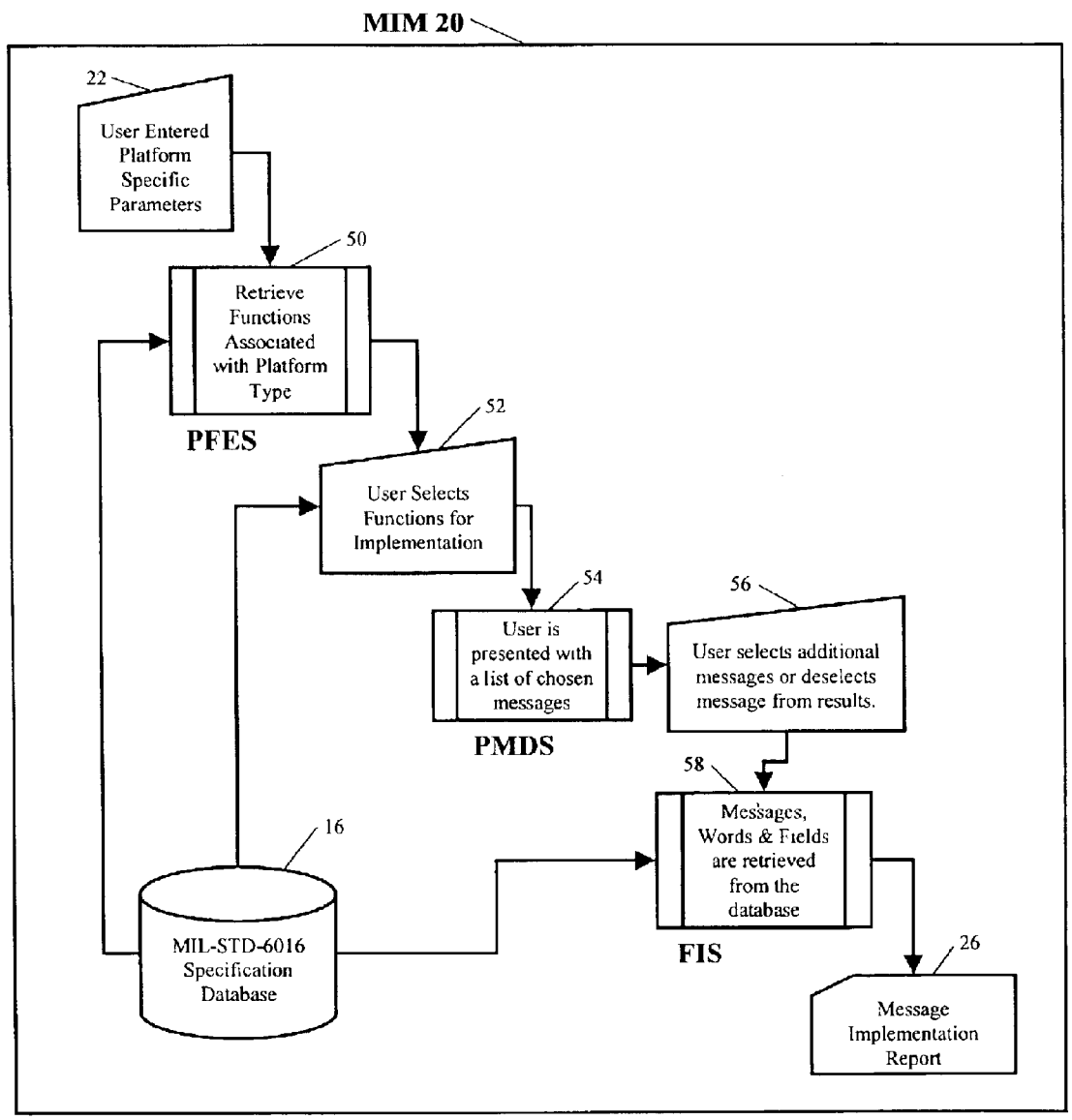
FIG. 3 is a schematic illustration of the message implementation module (MIM) of the present invention.

Referring now to FIG. 3, a preferred embodiment of the MIM 20 is illustrated. The second GUI 22 provides the capability to select platform specific parameters associated with a desired usage of the digital message standard on a platform. A platform function evaluation sub-module (PFES) 50 retrieves associated functions from the digital message standard that correlate with the selected platform specific parameters. The second GUI 22 provides the capability to select specific required platform functions that correlate to the desired usage (block 52). Should a user select a function that requires additional related functions to be implemented as defined by the digital message standard 16, the user will be forced to fulfill all functional requirements (block 52) before proceeding to the next step where the user is presented with the list of chosen messages based on the platform specific parameters (block 54). Before generating the final message implementation report 26, the user has the option of adding or removing additional messages (block 56). Once the user accepts the list of messages presented for implementation, an automated process is initiated (block 58) resulting in the generation of a message implementation report 26. During the report generation process, the words and fields associated with each selected message are retrieved from the digital message standard database 16 along with the minimum implementation requirements for each respective message, word, and field. Using the message implementation report, the user can further refine the platform's specific implementation at the message, word, and field level before importing it back into the platform implementation database 70 that is a part of the PIM 28, described in detail below.

A platform message development sub-module (PMDS) 54 determines corresponding required digital messages associated with the selected required platform functions and presents the results to the user as a minimum implementation. Within the digital message standard 16, there is a table that defines the messages associated with each major function as defined by the message standard documentation. Each function is assigned a unique ID in the exact same manner as each of the platforms. Thus, using the function ID, the message IDs associated with a respective function can be retrieved through the same table lookup process. Unlike the platform files, links to related messages for each function are stored in the digital message standard 16 database (as opposed to the platform implementation database 48). To ensure that the user also catches all related functions and their respective messages, a second table exists for establishing links between related function groups. As a result, the inclusion of one function group can force the inclusion of a second function group. In the event that the user selects a function group with unconditional related functions, the related function (and messages) is added to the list automatically without requiring any operator interaction. However, should the user select a conditional function that requires one or more related function(s), he or she will be prompted with a filtered list of functions from which he or she must choose at least one additional function. This process continues until the user has satisfied all related functional requirements at which time the list of messages for each function is retrieved and correlated before being displayed to the user for confirmation.

A final implementation sub-module (FIS) 58 retrieves digital message structures, word layouts, and data elements/ fields corresponding to the final digital message implementation, as required in the digital message standard for the messages developed and presented in the results, thus providing the message implementation report.

Figure 4:
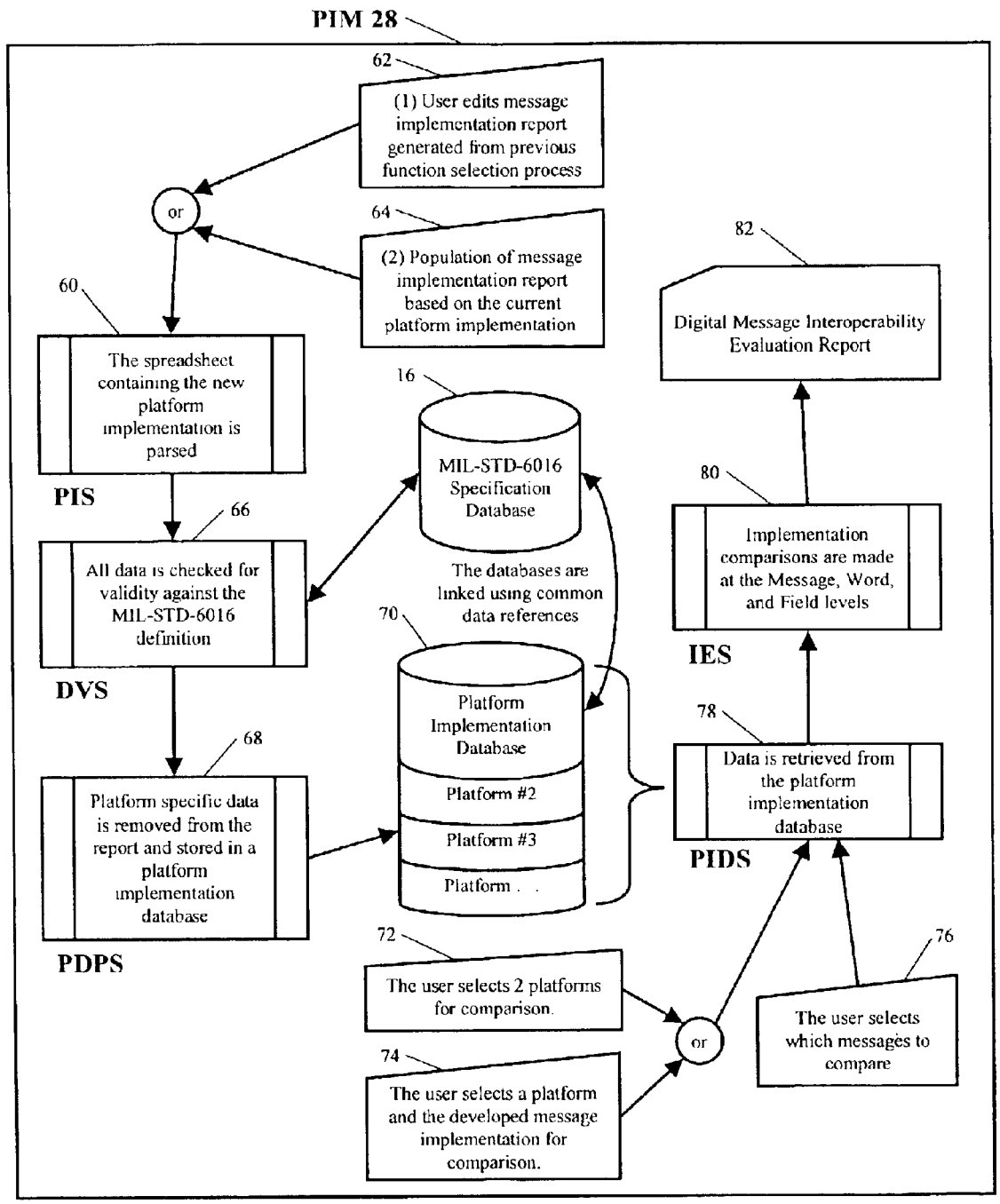
FIG. 4 is a schematic illustration of the platform interoperability module (PIM) of the present invention.

Referring now to FIG. 4, a preferred embodiment of the PIM 28 is illustrated. A platform implementation sub-module (PIS) 60 accepts a specific platform digital message implementation for the digital message standard via (1) a modification of the message implementation report (block 62) or (2) population of the message implementation report based on the current platform implementation (block 64). When the user selects a file for importation, he or she is presented with a list of message groups from which whole groups can be excluded from the import process. Since the platform unique ID is not contained in the import file, the user is required to select the platform before beginning the importation process. The selection of the platform defines which platform implementation database 70 the information will be stored in. During the importation process, the PIS 60 presents the user with feedback regarding the progress and the identification of each message, word, and field being parsed and imported into the database. Each platform implementation database 70 version is managed through automatic revision control allowing end users to quickly assess platform data quality and/or staleness. The PDPS 70 provides the revision control and increments the appropriate revision number whenever information in a platform implementation database 70 is updated through the PIM 28.

A data validation sub-module (DVS) 66 validates the parameters contained in the parsed report against the requirements contained within the digital message standard 16, thus providing a set of validated parameters. As each line is read in from the input file, checks are made to determine the type of data (message, word, or field). Once the data type has been determined, the appropriate table in the digital message standard 16 is queried to determine the database unique ID for the respective data element that was parsed based on some unique characteristic (name, unique identifier, group number, etc.) of the parsed element. Since some words and fields share common characteristics, the parsing process requires the determination of the message ID before the word ID can be retrieved and similarly the determination of the word ID before the field ID can be retrieved. This is because the message ID is required to locate the exact word ID and the word ID is required to locate the exact field ID. If the ID cannot be located based on the message, word, or field characteristics, the user is notified of the invalid data and the importation process is terminated requiring the user to correct the errant data in the input file. If the element's ID is successfully retrieved from the digital message standard 16, then further validation checks will be made on the platform implementation specification values. Valid implementation values are stored within the digital message standard database 16 in a series of tables. Each table contains the set of valid values for the field as defined by the message standard documentation. After all range checks have been performed and deemed successful, the data element ID of that single entry is stored (block 68) along with the platform ID and the implementation specification values.

A platform database population sub-module (PDPS) 68 stores the set of validated parameters into a platform implementation database 70. The third GUI 30 provides the capability to conduct a platform digital message implementation evaluation by either (1) selecting two specific platform digital message implementations contained within the platform implementation database (block 72) or (2) selecting a developed minimum implementation for a specific platform and the corresponding platform digital message implementation contained within the platform implementation database (block 74). Thus, an implementation comparison file is provided. The third GUI 30 provides the capability to select the digital messages to be analyzed in the platform digital message implementation evaluation (block 76), thus providing a selected digital message file.

A platform implementation database sub-module (PIDS) 78 retrieves the corresponding information for the platforms identified in the implementation comparison file and digital messages identified in the selected digital message file contained in the platform implementation database, thus providing an information comparison file.

An implementation evaluation sub-module (IES) 80 conducts the digital message implementation evaluation on the information contained in the information comparison file, thus providing a digital message interoperability evaluation report.

A practical example of the implementation of the principles of the present invention is discussed below:

Link-16 is a current and future data link for the armed forces. There are many military platforms (e.g. Comanche, F/A-18, AWACS, ABL, F-15, F-16, JSF, etc.) that incorporate Link-16 as a major digital communication link. This data link spans across all services of the military. The Link-16 data link utilizes the Tactical Digital Information Link J series (TADIL-J) message protocol. Interoperability between platform implementations using the TADIL-J message set is a time consuming and expensive issue that is extremely difficult to coordinate. The military standard also provides all the message transmit/receive rules, message format/layout, data element definitions, and minimum implementation requirements. There are three major issues when implementing TADIL-J messages on a platform:

1. Reading and interpreting the Military Standard 6016 Revision A (MIL-STD-6016A).
2. Development of the TADIL-J minimum implementation message set (Appendix A of MIL-STD-6016A).
3. Implementing an interoperable message set with other platforms.

The tool of the present invention provides a unique solution for each identified issue identified above.

To address the first identified issue above, the tool provides a series of dialog boxes and templates that take the user through a series of ordered tasks to facilitate and ease the management of the vast amount of data contained in the MIL-STD-6016. As depicted in FIG. 2 discussed above, the user can select a specific digital message layout with all associated interdependencies cross-referenced on one consolidated display. The user can also view the implementation of a specific platform for that selected message.

The second identified issue, TADIL-J minimum implementation (Minlmp), is addressed in the DMAT by providing the user with the capability of stepping through a question and answer process on their platform implementation. This was represented in FIG. 3, above. Instead of requiring the user to interpret the entire MIL-STD-6016, the DMAT provides a user-friendly interface that pairs down the information that the user needs to interpret when defining their platform's minimum implementation for the first time. As shown in FIG. 3, the user first enters information specific to their platform. Based on this information, the DMAT retrieves the list of available Link-16 based functions that a platform may implement. This list is presented in such a manner that users may point and click on the functions that they wish to implement. Subsequently, the DMAT searches the database again to ensure that all related functions, as defined by the MILD-STD-6016, are also included in the function list. Next, the user is presented with a compiled list containing all of the messages he or she is required to implement based on the user's inputs to that point. It is at this time that the user may choose to either accept all of the proposed Link-16 messages or he or she may edit the list as desired before beginning the output process. Upon beginning the output process, all of the required messages, words, and elements presented in the compiled list are output to a spreadsheet that the user may edit yet further. Finally, the user may take this spreadsheet and import it back into their platform specific database file via the DMAT so that their platform's implementation may be compared with other platforms.

The last identified issue, message set interoperability, is the most difficult issue to solve. The DMAT administers this process by allowing each platform to maintain its data in separate database files. The DMAT then provides a series of utilities whereby the user can quickly assess the differences between two platforms or a platform and it's required minimum implementation by generating a comparison report.

The most important part of this process is ensuring that each platform's data is entered into the database properly. FIG. 4 depicts the process for entering platform specific data into the DMAT database. The user has two options. He may start with the output generated from the PIM, or the user may temporarily export their platform's implementation data to a spreadsheet as depicted in FIG. 4 and edit the information already contained in the database. In both cases, the spreadsheets contain the necessary range checking parameters to ensure that the user is not allowed to enter a value that is inappropriate. This saves time because the need to go back and repeat the data entry process due to operator error is greatly reduced. Next, the user utilizes the DMAT to import the spreadsheets, thus storing the data back into their respective platform implementation database file. These database files can then be shared with other users without the fear of modification because platform specific data can only be modified through the use of the spreadsheets. The DMAT further protects this process by assigning specific users the right to import and export spreadsheets thus preventing another user from inadvertently overwriting another platform's implementation.

The number of implementations is only limited by the size of the host computers storage capability. Once a platform has defined its implementation, the DMAT can be used to generate comparison reports with any other platform, or the MIL-STD-6016 minimum implementation itself. FIG. 4 depicts this comparison process. The user starts by selecting the two platforms and the Link-16 messages that he wishes to compare. Next, the DMAT retrieves the platform specific information from each of the platform specific databases. Differences in transmit, receive, display, and implementation requirements are examined at the message, word, and element levels. Finally, a report highlighting all of the differences between the selected platforms and messages is generated. The most important part of this process is the fact that all reports will have a consistent look and feel thereby establishing a standardized style for depicting platform differences.

Although the present invention has been discussed relative to TADIL-J Message Protocol, it may have many different applications. For example, it can be used for Variable Message Format (TADIL-K series), Tactical Information Broadcast Sevice (TIBS), Tactical Related Applications Program (TRAP), and Tactical Data Information Exchange (TADIX) message protocols.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A digital message analysis tool for incorporating a digital message standard into a relational database, comprising:
   a) a message standard automation module (MSAM), including a digital message standard, said MSAM for automating said digital message standard into a relational database and for providing a first graphic user interface (GUI) that allows a user to view the desired contents of said digital message standard and requirement interdependencies associated within said digital message standard;
   b) a message implementation module (MIM), in communication with said MSAM, said MIM including a second GUI, said MIM for developing and providing a message implementation in accordance with said digital message standard, said MIM utilizing said message implementation for providing a message implementation report; and,
   c) a platform interoperability module (PIM), in communication with said MSAM, said PIM including a third GUI, said PIM for entering a platform digital message implementation for said digital message standard and for conducting an interoperability analysis between multiple platform digital message implementations using said third GUI, said PIM also providing a digital message interoperability evaluation report of said evaluation, wherein said MSAM, said MIM, and said PIM cooperate to provide an efficient access to said digital message standard, efficient development of a platform message implementation, and efficient evaluation of interoperability between multiple platforms/programs.

2. The digital message analysis tool of claim 1, wherein said digital message standard comprises a plurality of parsed sections that cross-reference said relational database.

3. The digital message analysis tool of claim 1, wherein said MSAM, comprises:
   a) a digital message standard database access sub-module (DMSDAS) for allowing a user to view said desired contents of said digital message standard and requirement interdependencies associated within said digital message standard; and,
   b) a platform database message implementation access sub-module (PDMIAS) for accessing a specific platform digital message implementation of said digital message standard on a message by message basis.

4. The digital message analysis tool of claim 1, wherein said MIM, comprises:
   a) said second GUI providing the capability to select platform specific parameters associated with a desired usage of said digital message standard on a platform;
   b) a platform function evaluation sub-module (PFES) for retrieving associated functions from said digital message standard that correlate with said selected platform specific parameters;
   c) said second GUI providing the capability to select specific required platform functions that correlate to said desired usage;

d) a platform message development sub-module (PMDS) for determining corresponding required digital messages associated with said selected required platform functions and for presenting the results to the user as a minimum implementation, said second GUI providing the capability to select additional digital messages or deselect digital messages from said minimum implementation to develop a final digital message implementation; and, e) a final implementation sub-module (FIS) for retrieving digital message structures, word layouts, and data elements/fields corresponding to said final digital message implementation, as required in said digital message standard for the messages developed and presented in said results, thus providing said message implementation report.

5. The digital message analysis tool of claim 4, wherein said PIM, comprises:

a) a platform implementation sub-module (PIS) for accepting a specific platform digital message implementation for said digital message standard via (1) a modification of said message implementation report or (2) population of said message implementation report based on the current platform implementation, said PIS for parsing said specific platform digital message into sections corresponding to the said digital message standard, thus providing a parsed report;

b) a data validation sub-module (DVS) for validating the parameters contained in said parsed report against the requirements contained within said digital message standard, thus providing a set of validated parameters;

c) a platform database population sub-module (PDPS) for storing said set of validated parameters into a platform implementation database, said third GUI for providing the capability to conduct a platform digital message implementation evaluation by either (1) selecting two specific platform digital message implementations contained within said platform implementation database or (2) selecting a developed said minimum implementation for a specific platform and the corresponding platform digital message implementation contained within said platform implementation database, thus providing a implementation comparison file, said third GUI providing the capability to select the digital messages to be analyzed in said platform digital message implementation evaluation, thus providing a selected digital message file;

d) a platform implementation database sub-module (PIDS) for retrieving the corresponding information for the platforms identified in said implementation comparison file and digital messages identified in said selected digital message file contained in said platform implementation database, thus providing a information comparison file; and, e) an implementation evaluation sub-module (IES) to conduct said digital message implementation evaluation on the information contained in said information comparison file, thus providing said digital message interoperability evaluation report.

6. The digital message analysis tool of claim 1, wherein said digital message standard comprises Military Standard 6016 and its revisions.

7. A digital message analysis tool for incorporating a digital message standard into a relational database, comprising:

a) a message standard automation module (MSAM), including a digital message standard, said MSAM for automating said digital message standard into a relational database and for providing a first graphic user interface (GUI) that allows a user to view the desired contents of said digital message standard and requirement interdependencies associated within said digital message standard, said MSAM comprising:

i) a digital message standard database access sub-module (DMSDAS) for allowing a user to view said desired contents of said digital message standard and requirement interdependencies associated within said digital message standard; and, ii) a platform database message implementation access sub-module (PDMIAS) for accessing a specific platform digital message implementation of said digital message standard on a message by message basis;

b) a message implementation module (MIM), in communication with said MSAM, said MIM including a second GUI, said MIM for developing and providing a message implementation in accordance with said digital message standard, said MIM utilizing said message implementation for providing a message implementation report, said MIM comprising:

i) said second GUI providing the capability to select platform specific parameters associated with a desired usage of said digital message standard on a platform;

ii) a platform function evaluation sub-module (PFES) for retrieving associated functions from said digital message standard that correlate with said selected platform specific parameters;

iii) said second GUI providing the capability to select specific required platform functions that correlate to said desired usage;

iv) a platform message development sub-module (PMDS) for determining corresponding required digital messages associated with said selected required platform functions and for presenting the results to the user as a minimum implementation, said second GUI providing the capability to select additional digital messages or deselect digital messages from said minimum implementation to develop a final digital message implementation; and, v) a final implementation sub-module (FIS) for retrieving digital message structures, word layouts, and data elements/fields corresponding to said final digital message implementation, as required in said digital message standard for the messages developed and presented in said results, thus providing said message implementation report; and, c) a platform interoperability module (PIM), in communication with said MSAM, said PIM including a third GUI, said PIM for entering a platform digital message implementation for said digital message standard and for conducting an interoperability analysis between multiple platform digital message implementations using said third GUI, said PIM also providing a digital message interoperability evaluation report of said evaluation, wherein said MSAM, said MIM, and said PIM cooperate to provide an efficient access to said digital message standard, efficient development of a platform message implementation, and efficient evaluation of interoperability between multiple platforms/programs.

8. The digital message analysis tool of claim 7, wherein said digital message standard comprises a plurality of parsed sections that cross-reference said relational database.

9. The digital message analysis tool of claim 7, wherein said PIM, comprises:
a) a platform implementation sub-module (PIS) for accepting a specific platform digital message implementation for said digital message standard via (1) a modification of said message implementation report or (2) population of said message implementation report based on the current platform implementation, said PIS for parsing said specific platform digital message into sections corresponding to the said digital message standard, thus providing a parsed report;
b) a data validation sub-module (DVS) for validating the parameters contained in said parsed report against the requirements contained within said digital message standard, thus providing a set of validated parameters;
c) a platform database population sub-module (PDPS) for storing said set of validated parameters into a platform implementation database,
said third GUI for providing the capability to conduct a platform digital message implementation evaluation by either (1) selecting two specific platform digital message implementations contained within said platform implementation database or (2) selecting a developed said minimum implementation for a specific platform and the corresponding platform digital message implementation contained within said platform implementation database, thus providing a implementation comparison file,
said third GUI providing the capability to select the digital messages to be analyzed in said platform digital message implementation evaluation, thus providing a selected digital message file;
d) a platform implementation database sub-module (PIDS) for retrieving the corresponding information for the platforms identified in said implementation comparison file and digital messages identified in said selected digital message file contained in said platform implementation database, thus providing a information comparison file; and,
e) an implementation evaluation sub-module (IES) to conduct said digital message implementation evaluation on the information contained in said information comparison file, thus providing said digital message interoperability evaluation report.

10. The digital message analysis tool of claim 7, wherein said digital message standard comprises Military Standard 6016 and its revisions.

11. A digital message analysis tool for incorporating a digital message standard into a relational database, comprising:
a) a message standard automation module (MSAM), including a digital message standard, said MSAM for automating said digital message standard into a relational database and for providing a first graphic user interface (GUI) that allows a user to view the desired contents of said digital message standard and requirement interdependencies associated within said digital message standard, said MSAM comprising:
 i) a digital message standard database access sub-module (DMSDAS) for allowing a user to view said desired contents of said digital message standard and requirement interdependencies associated within said digital message standard; and,
 ii) a platform database message implementation access sub-module (PDMIAS) for accessing a specific platform digital message implementation of said digital message standard on a message by message basis;
b) a message implementation module (MIM), in communication with said MSAM, said MIM including a second GUI, said MIM for developing and providing a message implementation in accordance with said digital message standard, said MIM utilizing said message implementation for providing a message implementation report; and,
c) platform interoperability module (PIM), in communication with said MSAM, said PIM including a third GUI, said PIM for entering a platform digital message implementation for said digital message standard and for conducting an interoperability analysis between multiple platform digital message implementations using said third GUI, said PIM also providing a digital message interoperability evaluation report of said evaluation, said PIM comprising:
 i) a platform implementation sub-module (PIS) for accepting a specific platform digital message implementation for said digital message standard via (1) a modification of said message implementation report or (2) population of said message implementation report based on the current platform implementation, said PIS for parsing said specific platform digital message into sections corresponding to the said digital message standard, thus providing a parsed report;
 ii) a data validation sub-module (DVS) for validating the parameters contained in said parsed report against the requirements contained within said digital message standard, thus providing a set of validated parameters;
 iii) platform database population sub-module (PDPS) for storing said set of validated parameters into a platform implementation database,
 said third GUI for providing the capability to conduct a platform digital message implementation evaluation by either (1) selecting two specific platform digital message implementations contained within said platform implementation database or (2) selecting a developed said minimum implementation for a specific platform and the corresponding platform digital message implementation contained within said platform implementation database, thus providing a implementation comparison file,
 said third GUI providing the capability to select the digital messages to be analyzed in said platform digital message implementation evaluation, thus providing a selected digital message file;
 iv) a platform implementation database sub-module (PIDS) for retrieving the corresponding information for the platforms identified in said implementation comparison file and digital messages identified in said selected digital message file contained in said platform implementation database, thus providing a information comparison file; and,
 v) an implementation evaluation sub-module (IES) to conduct said digital message implementation evaluation on the information contained in said information comparison file, thus providing said digital message interoperability evaluation report,
wherein said MSAM, said MIM, and said PIM cooperate to provide an efficient access to said digital message standard, efficient development of a platform message implementation, and efficient evaluation of interoperability between multiple platforms/programs.

12. The digital message analysis tool of claim 11, wherein said digital message standard comprises a plurality of parsed sections that cross-reference said relational database.

13. The digital message analysis tool of claim 11, wherein said MIM, comprises:

a) said second GUI providing the capability to select platform specific parameters associated with a desired usage of said digital message standard on a platform;

b) a platform function evaluation sub-module (PFES) for retrieving associated functions from said digital message standard that correlate with said selected platform specific parameters;

c) said second GUI providing the capability to select specific required platform functions that correlate to said desired usage;

d) a platform message development sub-module (PMDS) for determining corresponding required digital messages associated with said selected required platform functions and for presenting the results to the user as a minimum implementation, said second GUI providing the capability to select additional digital messages or deselect digital messages from said minimum implementation to develop a final digital message implementation; and, f) a final implementation sub-module (FIS) for retrieving digital message structures, word layouts, and data elements/fields corresponding to said final digital message implementation, as required in said digital message standard for the messages developed and presented in said results, thus providing said message implementation report.

14. The digital message analysis tool of claim 11, wherein said digital message standard comprises Military Standard 6016 and its revisions.

* * * * *